United States Patent [19]
Clarke et al.

[11] Patent Number: 5,854,701
[45] Date of Patent: Dec. 29, 1998

[54] PASSIVE OPTICAL NETWORK

[75] Inventors: Donald Eric Arthur Clarke; Michael Anthony Hale, both of Essex; Jeremy Brian Chuter, Suffolk, all of England

[73] Assignee: British Telecommunications public limited company, London, England

[21] Appl. No.: 50,029

[22] Filed: Apr. 29, 1993

[30] Foreign Application Priority Data

Oct. 18, 1990 [GB] United Kingdom .................... 9022682

[51] Int. Cl.$^6$ ...................................................... H04J 14/08
[52] U.S. Cl. ............................................. 359/137; 359/167
[58] Field of Search ...................................... 359/115, 118, 359/121, 120, 123, 135, 136, 137, 167

[56] References Cited

U.S. PATENT DOCUMENTS

| | | | |
|---|---|---|---|
| 4,441,180 | 4/1984 | Schüssler | 359/117 |
| 4,776,041 | 10/1988 | Husbands | 359/164 |
| 5,150,247 | 9/1992 | Sharpe et al. | 359/136 |

*Primary Examiner*—Rafael Bacares
*Attorney, Agent, or Firm*—Nixon & Vanderhye P.C.

[57] ABSTRACT

A head-end station (1) is provided for a passive optical network system arranged to transmit downstream TDMA frames and receive upstream TDMA frames. The head-end station (1) comprises a TDMA master (5) and a plurality of optical stages (4a, 4b) connected in common to the TDMA master (5). The TDMA master (5) assembles incoming data into downstream TDMA frames and demultiplexes upstream TDMA frames. Each optical stage (4a, 4b) is arranged to be connected to a different respective fiber network (3a, 3b) and includes an optical transmitter which modulates an optical signal with downstream TDMA frames from the TDMA master (5) together with an optical receiver arranged to detect an optical signal carrying upstream TDMA frames.

8 Claims, 2 Drawing Sheets

PASSIVE OPTICAL NETWORK

BACKGROUND OF THE INVENTION

The present invention relates to a passive optical network (PON) system, and to a head-end station for use in such a PON system.

As described in the present applicant's International Patent Applications Numbers PCT/GB90/01758 and PCT/GB91/00100. Publications numbers WO91/08623 and WO91/11867), incorporated herein by reference, the present applicant has developed a bit transport system (BTS) for use in a TPON (telephony on a passive optical network) system. In this BTS, a head-end station includes a time division multiple access (TDMA) master which assembles incoming exchange traffic into TDMA frames. These frames are broadcast via an optical stage onto the fibre network. Each of a number of terminations connected to the network recognises and responds to an appropriately addressed portion in the data in the broadcast frame and ignores the remainder of the frame.

One major constraint in designing a PON system is the need to remain within a fixed optical power budget. Since the fibre network uses purely passive couplers there is a power loss of 3 dB associated with each split. In practice this limits the number of terminations which can be connected to any one head-end station. In one experimental system developed by the applicant, it was found that typically a maximum of 32 terminations could be connected to a single head-end station. Further terminations could not be accommodated within the optical power budget and so required the use of a second network with its own head-end station installed in parallel with the first network.

According to the present invention, there is provided a head-end station for a passive optical network system arranged to transmit downstream TDMA frames and receive upstream TDMA frames, which head-end station comprises a TDMA master and an optical stage connected to the TDMA master, the TDMA master comprising means for assembling incoming data into downstream TDMA frames and means for demultiplexing upstream TDMA frames, the optical stage being arranged to be connected to a fibre network and comprising an optical transmitter arranged to modulate an optical signal with downstream TDMA frames output by the TDMA master, and an optical receiver arranged to detect an optical signal carrying upstream TDMA frames, characterised by: at least one further optical stage connected to the TDMA master, being arranged to be connected to a respective fibre network, and whose optical transmitter is arranged to modulate an optical signal with said downstream TDMA frames output by the TDMA master; and by the demultiplexing means being arranged to demultiplex each upstream TDMA frame.

The present invention by providing a head-end station the output of which is split prior to the optical stage, makes possible the connection of several fibre networks to a single head-end station. The number of terminations which can be accommodated in this fashion is unconstrained by the optical power budget, the only practical limit being afforded by the data capacity of the TDMA master itself. A considerable saving in cost is achieved by comparison with alternative approaches such as the use of separate parallel networks each having its own head-end station.

According to a second aspect of the present invention there is provided a passive optical network system comprising a passive optical fibre network connected to a head-end station including a TDMA master and an optical stage connected to the TDMA master and to the optical fibre network, the system being characterised by at least one further passive optical fibre network connected to a corresponding further optical stage in the head-end station, and in that the optical stages are connected in common to the TDMA master.

BRIEF DESCRIPTION OF DRAWINGS

A system in accordance with the present invention will now be described in detail with reference to the accompanying drawings in which.

DESCRIPTION OF PREFERRED EMBODIMENT

Figure 1:
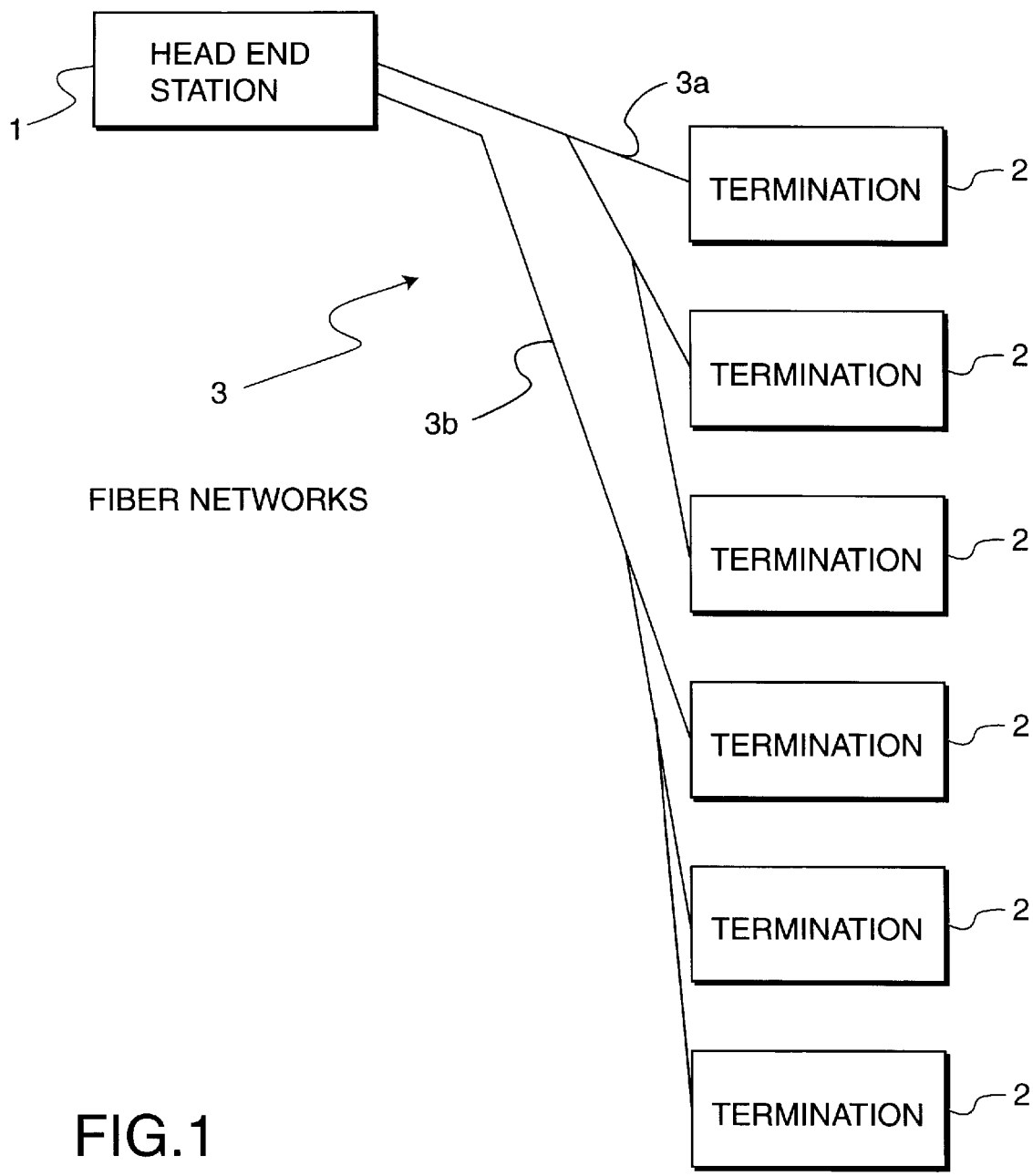
FIG. 1 is a block diagram showing a TPON system.
Figure 2:
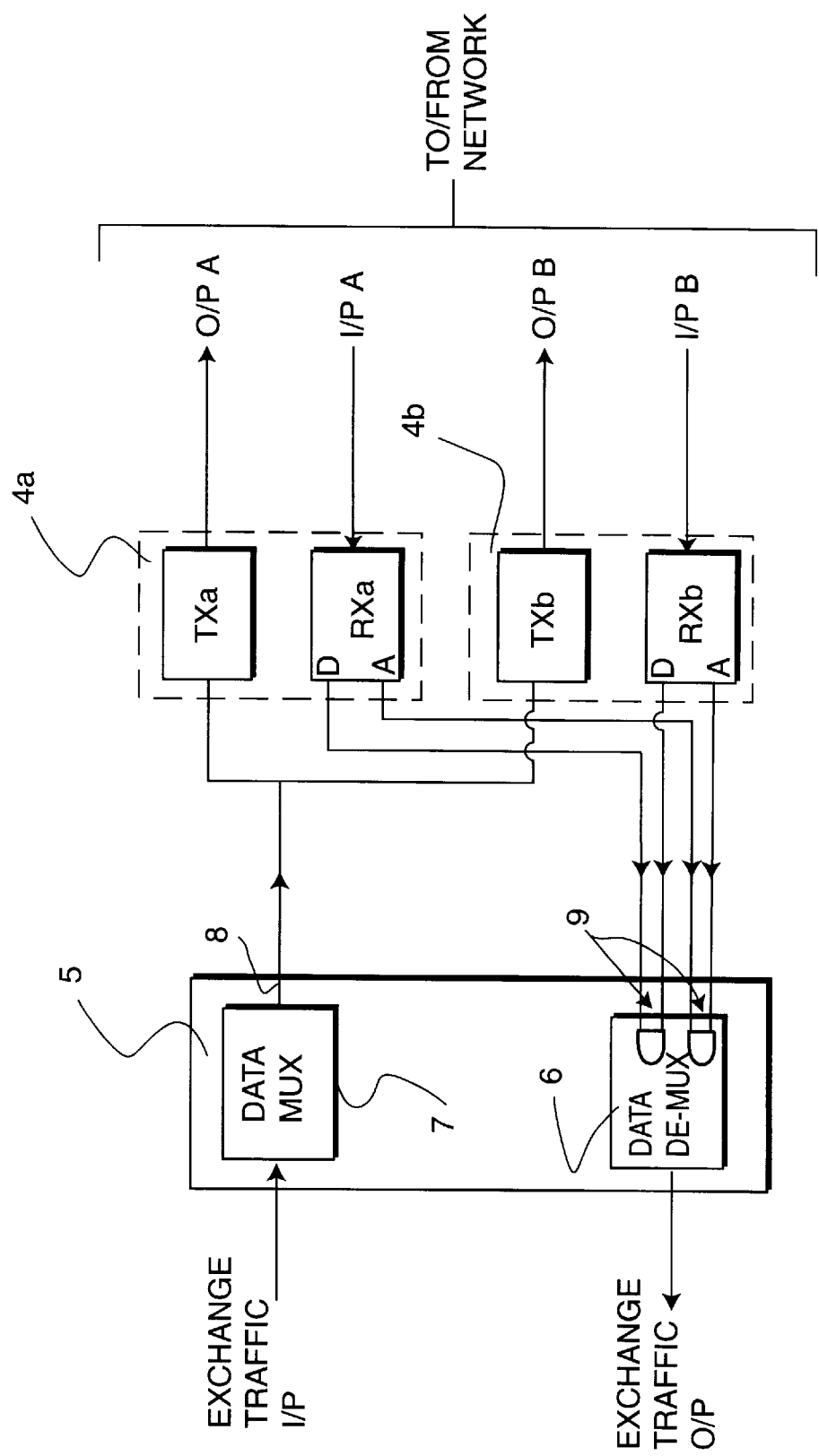
FIG. 2 is a block diagram of a head-end station.

A TPON system sometimes referred to as a network; comprises a head-end station 1, a number of terminations 3, and a passive optical fibre network 3, linking the head-end station 1 to the terminations 2. The fibre network 3 comprises two parallel networks 3a, 3b. Although, for clarity, only three terminations 2 are shown connected to each of the parallel networks 3a, 3b, in practice typically 32 terminations 2 are connected via each network 3a, 3b to the head-end station 1. Typically the head-end station 1 is located in a local telephone exchange and the terminations 2 are subscriber stations in domestic or commercial premises or in street cabinets in the neighbourhood of the local exchange.

The head-end station 1 broadcasts data over the fibre network 3 as downstream time division multiple access (TDMA) frames a predetermined format. The frames include control channels addressed to specific ones of the terminations 2 to control, amongst other parameters, the amplitude and timing of the optical signals transmitted onto the fibre network 3 by the terminations 2. In the upstream direction, each termination 2 transmits data in a predetermined time slot. The data is processed at the head-end station 1 by a TDMA master 5 in which the upstream frames are demultiplexed by a demultiplexer 6 and arranged in TDM frames as outgoing exchange traffic. A multiplexer 7 in the same TDMA master 5 assembles incoming exchange traffic into TDMA frames for broadcasting in the downstream direction.

Each termination has an individual address and responds only to correspondingly addressed portions of any transmission. Accordingly, throughout the TPON system, data can be broadcast without requiring the routing of specific frames through specific paths. The broadcast structure is extended in the head-end station itself by the connection of multiple optical stages 4a, 4b in common to output 8 of a single TDMA master so as to receive a broadcast output from the master. The TDMA master as well assembling the downstream frames and disassembling the upstream frames received from the network, carries out control functions such as housekeeping.

The structure of the head-end station is shown in greater detail in FIG. 1. Each optical stage includes a transmitter TXa. Txb including an optical source, typically a laser diode, and a receiver RXa, RXb which incorporates a photo-sensitive detector and converts incoming optical signals into electrical signals which are output to the master from both analogue A and digital D outputs. The TDMA master includes a branched output which is connected to the transmitters in each of the optical stages. The TDMA master also includes a dual input 9 comprising a digital OR gate connected to digital outputs of each of the receivers and an analogue input connected in common to the analogue output of each receiver. As described in the present applicant's International Patent Application number PCT/GB90/01758 (incorporated herein) the provision of an analogue output enables high speed sampling of the incoming signal by the TDMA master for control and diagnostic purposes.

We claim:

1. A head-end station for a passive optical network system arranged to transmit downstream time division multiple access (TDMA) frames and receive upstream TDMA frames, said head-end station comprising a TDMA master and an optical stage connected to the TDMA master, the TDMA master comprising means for assembling incoming data into downstream TDMA frames and means for demultiplexing upstream TDMA frames, the optical stage being arranged to be connected to a fiber network and comprising an optical transmitter arranged to modulate an optical signal with downstream TDMA frames output by the TDMA master, and an optical receiver arranged to detect an optical signal carrying upstream TDMA frames, said head-end station further comprising:

at least one further optical stage connected to the TDMA master being arranged to be connected to a respective fiber network, and having an optical transmitter arranged to modulate an optical signal with said downstream TDMA frames output by the TDMA master, and a demultiplexing means for demultiplexing each received upstream TDMA frame, and wherein a data output of the TDMA master is connected in common to respective inputs of the transmitters of the plurality of optical stages, and the outputs of the receivers of the plurality of optical stages are connected in parallel to a data input of the TDMA master.

2. A head-end station according to claim 1, in which the receiver output of each optical stage comprises parallel analog and digital outputs, and the data input of the TDMA master comprises corresponding digital and analog inputs connected to the respective digital and analog outputs of the optical stages.

3. A passive optical network system comprising a first passive optical fiber network connected to a time division multiple access (TDMA) master, a first optical stage connected to the TDMA master and to the optical fiber network, at least one additional optical stage connected to at least one additional passive optical fiber network, and wherein the optical stages are connected in common to the TDMA master.

4. A passive optical network system as in claim 3 wherein the TDMA master and optical stages are included in a head-end station.

5. A passive optical network system as in claim 3 wherein the TDMA master is located in a local telephone exchange.

6. A passive optical network system as in claim 4 wherein the head-end station is located in a local telephone exchange.

7. A passive optical network system as in claim 3 wherein the fiber networks are arranged in parallel.

8. A passive optical network as in claim 1 wherein the fiber networks are connected in parallel to the TDMA master.

* * * * *